United States Patent
Okuda et al.

(10) Patent No.: US 6,335,405 B1
(45) Date of Patent: Jan. 1, 2002

(54) CATALYSTS FOR OLEFIN POLYMER PRODUCTION AND PROCESS FOR PRODUCING OLEFIN POLYMER

(75) Inventors: Fumio Okuda; Haruhito Sato, both of Ichihara; Toshiya Abiko, Tokyo, all of (JP)

(73) Assignee: Idemitsu Petrochemical Co., Ltd., Tokyo (JP)

( * ) Notice: Subject to any disclaimer, the term of this patent is extended or adjusted under 35 U.S.C. 154(b) by 0 days.

(21) Appl. No.: 09/423,655

(22) PCT Filed: Mar. 19, 1999

(86) PCT No.: PCT/JP99/01388

§ 371 Date: Dec. 13, 1999

§ 102(e) Date: Dec. 13, 1999

(87) PCT Pub. No.: WO99/48930

PCT Pub. Date: Sep. 30, 1999

(30) Foreign Application Priority Data

Mar. 3, 1998 (JP) ............................................. 10-72699
Mar. 3, 1998 (JP) ............................................. 10-72700
Mar. 20, 1998 (JP) ............................................. 10-72698

(51) Int. Cl.⁷ .................................................. C08F 4/42
(52) U.S. Cl. ........................ 526/161; 526/129; 526/155; 526/171; 526/352; 502/117; 502/118; 502/132; 502/108; 502/104
(58) Field of Search ................................. 526/161, 352, 526/129, 155, 171; 502/117, 118, 132, 108, 104

(56) References Cited

U.S. PATENT DOCUMENTS 5,001,244 A * 3/1991 Welborn, Jr. .................. 556/53
5,308,811 A * 5/1994 Suga et al. .................... 502/62

FOREIGN PATENT DOCUMENTS

| EP | 0 945 471 | * | 9/1999 |
| JP | 44-25353 | * | 10/1969 |
| JP | 5-301917 | * | 11/1993 |
| JP | 6-211925 | * | 8/1994 |
| JP | 10-195128 | * | 7/1998 |
| JP | 10-298225 | * | 11/1998 |
| JP | 11-106418 | * | 4/1999 |
| WO | WO 97/48736 | * | 12/1997 |

* cited by examiner

Primary Examiner—Bernard Lipman
Assistant Examiner—Ling-Siu Choi
(74) Attorney, Agent, or Firm—Oblon, Spivak, McClelland, Maier & Neustadt, P.C.

(57) ABSTRACT

Catalysts for olefin polymerization comprising (a) a compound of a transition metal of Groups 8 to 10 of the Periodic Table, (b) clay, a clay mineral or an ion-exchanging layered compound, (c) a silane compound, and optionally (d) an organic aluminium compound and/or (e) an alkylating agent, and those comprising (a) a compound of a transition metal of Groups 8 to 10 of the Periodic Table, (b) clay, a clay mineral or an ion-exchanging layered compound, (d) an organic aluminium compounds and optionally (e) an alkylating agent have high activity, though not containing a large amount of aluminoxane. Using the catalysts, high-quality olefin polymers with good morphology are produced efficiently. The amount of the residual metal to remain in the polymers produced is small.

13 Claims, No Drawings

CATALYSTS FOR OLEFIN POLYMER PRODUCTION AND PROCESS FOR PRODUCING OLEFIN POLYMER

TECHNICAL FIELD

The present invention relates to catalysts for olefin polymer production and to a method for producing olefin polymers. More precisely, it relates to novel catalysts with which practical high-melting-point and high-molecular-weight olefin polymers, especially polyethylenes are produced efficiently, inexpensively, and industrially advantageously, and to a method of using the catalysts for olefin polymer production.

BACKGROUND OF THE INVENTION

As catalysts for olefin polymer production, at present, mainly used are Ziegler catalysts and metallocene catalysts, which comprise, as the essential catalyst component, a compound of a metal element of Group 4 of the Periodic Table such as titanium or zirconium. Of metallocene catalysts, those comprising metallocene and aluminoxane are much used (Japanese Patent Laid-Open Nos. 19309/1983, 167307/1990, etc.). As compared with that of Ziegler catalysts, the polymerization activity of such metallocene catalysts, relative to the transition metal therein, is extremely high. Using metallocene catalysts gives polymers having a narrow molecular weight distribution.

On the other hand, recently, novel catalysts comprising a metal complex with a metal of Groups 8 to 10 of the Periodic Table, such as typically nickel or palladium, have been developed, apart from the catalysts noted above. Heretofore, nickel complexes have been known as oligomerization catalysts for olefins, and it is said that they are unsuitable to polymer formation.

Regarding the techniques that relate to such catalysts comprising a nickel or palladium complex, various proposals have heretofore been made, including, for example, (1) a method of using a catalyst that comprises an Ni(O) complex as coordinated with an adduct of quinone and a tertiary phosphine, for ethylene polymerization (Japanese Patent Publication No. 1796/1993); (2) a catalyst comprising an Ni(O) complex, an adduct of maleic anhydride and a tertiary phosphine, a phosphorus ylide, and an organic aluminium compound (Japanese Patent Laid-Open No. 203106/1986); (3) a catalyst comprising an Ni(O) or Ni(II) complex and an iminophospholane compound (Japanese Patent Laid-Open No. 115311/1991); (4) a method of using a borate complex with a metal of Group 8 to 10 (Fe, Co, Ni, Ru, Rh, Pd, Os, Ir, or Pt) coordinated with a cis-type chelate ligand, for ethylene polymerization; (5) a catalyst comprising an Ni(O) complex, an adduct of an imide and a tertiary phosphine, and a phosphine oxide (Japanese Patent Laid-Open No. 122721/1994); (6) a catalyst comprising a combination of a complex of Pd(II) with $BF_4^-$ and methylaluminoxane (Japanese Patent Laid-Open No. 82314/1995); (7) a catalyst comprising an Ni(II) complex, an iminophospholane compound and an organic aluminium compound (Japanese Patent Laid-Open No. 277610/1991); (8) a catalyst comprising an Ni(O) or Ni(II) complex and an iminophospholane compound having a bulky substituent (Japanese Patent Laid-Open No. 25932/1995); (9) a catalyst comprising a combination of a complex of Ni(II) with a phosphorus-oxygen chelate and a linear or cyclic aluminium compound (Japanese Patent Laid-Open No. 14217/1989), etc.

However, the above techniques of (1) to (8) for ethylene polymerization are all problematic in that they require an extremely high reaction pressure (for example, 100 kg/cm$^2$), that the catalysts indispensably contain a phosphorus-containing compound which will remain in the polymers formed to have some negative influences on the resinous properties of the polymers, and that expensive methylaluminoxane is indispensable for expressing the catalyst activity.

Precisely, the drawbacks to the ethylene polymerization method of (1) are that the reaction pressure is extremely high (for example 100 kg/cm$^2$) and that the catalyst activity to produce polyethylene is extremely low (about 6 kg/g—Ni·hr); and those to (2) are that the catalyst is for polymerization of high pressure ethylene, and is complicated as comprising many components, and that the catalyst activity is extremely low (at most about 1 kg/g—Ni·hr). The drawbacks to the others are as follows. For the catalyst of (3), the reaction pressure may be low, but the catalyst activity is extremely low (at most about 1 kg/g—Ni·hr). Also in the ethylene polymerization of (4), the catalyst activity is extremely low (at most about 0.1 kg/g—Ni·hr). The catalyst of (5) has a low activity (about 5 kg/g—Ni·hr). Though containing a cationic complex, the catalyst of (6) requires expensive methylaluminoxane for expressing its activity, and, in addition, its activity is low (at most about 3 kg/g—Ni·hr). The catalysts of (7) and (8) both have an extremely low activity (at most about 5 kg/g—Ni·hr). The catalyst (9) requires expensive methylaluminoxane serving as a catalyst promoter, and, in addition, its activity is low though the reaction pressure to be related to the activity is high (for example, about 20 kg/g—Ni·hr under 30 kg/cm$^2$G).

Recently, catalysts comprising a combination of a nitrogen-containing ligand complex, for example, a diimine complex with a metal of Groups 8 to 10, such as typically nickel or palladium, and an organic aluminium compound such as methylaluminoxane (MAO) or the like, and those comprising a combination of such a nitrogen-containing ligand complex and an anion seed of, for example, BF4$^-$, PF6$^-$, SbF6$^-$, or BAF$^-$ [tetrakis(3,5-bistrifluoromethylphenyl)borate] have been proposed. For example, catalysts of the following [3] and [2] have been disclosed (International Patent Laid-Open No. 96/23010).

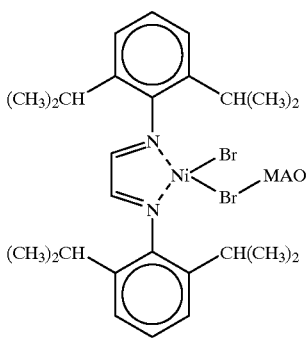

[1]

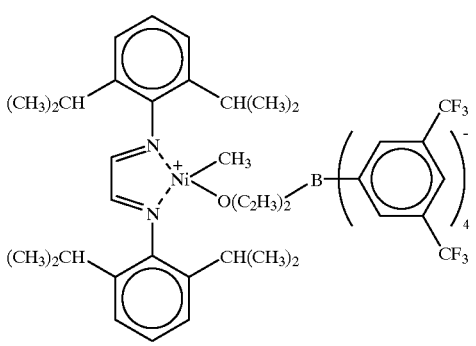

[2]

These catalysts have an extremely high activity for ethylene polymerization, as compared with the catalysts noted above, and, in addition, the polymers produced with them are characterized by having a poly-branched structure. However, these catalysts can be used only at low temperatures, and the molecular weight of the polymers produced with them is low. Therefore, these catalysts are not as yet practicable.

Moreover, metallocene/aluminoxane catalysts, and nitrogen-containing ligand complex with metal of Group 8 to 10/aluminoxane catalysts are still problematic in that they require a large amount of an aluminoxane in order to ensure sufficiently high polymerization activity. In particular, they require methylaluminoxane which is expensive and is not easy to handle and which is not stable during storage and is highly dangerous. Therefore, the polymerization efficiency with them is poor and, in addition, removing the catalyst residue from the polymers produced is indispensable.

Further, the method of using aluminoxane is problematic in that the polymers produced often adhere to the walls of reactors, and the polymer adhesion will be a bar to safe operation.

Another proposal for metallocene catalysts for olefin polymerization has been made, which is to add clay, a clay mineral or an ion-exchanging layered compound to the catalysts (Japanese Patent Laid-Open No. 301917/1993).

However, a catalyst comprising a combination of any of such additives and a nitrogen-containing ligand complex with a metal of Groups 8 to 10, with which the structure of the polymers produced differs from that of the polymers to be produced with the metallocene catalysts, is not known. In addition, in the proposed method, it is said the clay mineral to be used must be indispensably pre-treated with expensive and dangerous trimethylaluminium. Further, the proposed method is problematic in that the catalyst activity per aluminium is not so high and that the amount of the catalyst residue to remain in the polymers produced is large.

Given that situation, the present invention has its object to provide a novel catalyst for olefin polymerization to give polyolefins especially polyethylene having a high melting point or having a high molecular weight to be on a practicable level, and to provide a method of using the catalyst for olefin polymer production. The catalyst does not contain a large amount of methylaluminoxane which is expensive and is not easy to handle and which is not stable during storage and is highly dangerous. With the catalyst, the morphology of the polymers produced is easy to control. According to the method of using the catalyst, the intended polymers are produced inexpensively and advantageously on an industrial scale.

Another object of the invention is to provide a novel high-activity catalyst for olefin polymerization, which contains an organic aluminium compound but in which the amount of the organic aluminium compound is reduced relative to the total polymerization system, and to provide a method of using the catalyst for olefin polymer production. With the catalyst, the residual metal to remain in the olefin polymers produced is reduced, and the olefin polymers produced could have good quality. According to the method of using the high-activity catalyst, such high-quality polymers are produced efficiently and advantageously on an industrial scale.

DISCLOSURE OF THE INVENTION

We, the present inventors have assiduously studied so as to attain the objects noted above, and, as a result, have found that a catalyst comprising a compound of a transition metal of Groups 8 to 10 of the Periodic Table, any of clay, a clay mineral and an ion-exchanging layered compound, an organic aluminium compound, and optionally an alkylating agent, and also a method of using the catalyst for olefin polymerization, especially ethylene polymerization attain the objects.

We have further found that a catalyst comprising a compound of a transition metal of Groups 8 to 10 of the Periodic Table, any of clay, a claymineral and an ion-exchanging layered compound, a silane compound, and/or an alkylating agent, and also a method of using the catalyst for olefin polymerization, especially ethylene polymerization also attain the objects.

We have still further found that a catalyst comprising a compound of a transition metal of Groups 8 to 10 of the Periodic Table, any of clay, a clay mineral and an ion-exchanging layered compound, a silane compound, and an organic aluminium compound and/or an alkylating agent, and also a method of using the catalyst for olefin polymerization, especially ethylene polymerization also attain the objects.

On the basis of these findings, we have completed the present invention.

Specifically, the invention is to provide catalysts for olefin polymer production, and a method of using the catalyst for olefin polymer production, which are as follows:

(1) A catalyst for olefin polymer production, comprising (a) a compound of a transition metal of Groups 8 to 10 of the Periodic Table, (b) clay, a clay mineral or an ion-exchanging layered compound, and (c) a silane compound.

(2) A catalyst for olefin polymer production, comprising (a) a compound of a transition metal of Groups 8 to 10 of the Periodic Table, (b) clay, a clay mineral or an ion-exchanging layered compound, (c) a silane compound, and (d) an organic aluminium compound.

(3) A catalyst for olefin polymer production, comprising (a) a compound of a transition metal of Groups 8 to 10 of the Periodic Table, (b) clay, a clay mineral or an ion-exchanging layered compound, (c) a silane compound, and (e) an alkylating agent.

(4) A catalyst for olefin polymer production, comprising (a) a compound of a transition metal of Groups 8 to 10 of the Periodic Table, (b) clay, a clay mineral or an ion-exchanging layered compound, (c) a silane compound, (d) an organic aluminium compound, and (e) an alkylating agent.

(5) A catalyst for olefin polymer production, comprising (a) a compound of a transition metal of Groups 8 to 10 of the Periodic Table, (b) clay, a clay mineral or an ion-exchanging layered compound, and (d) an organic aluminium compound.

(6) A catalyst for olefin polymer production, comprising (a) a compound of a transition metal of Groups 8 to 10 of the Periodic Table, (b) clay, a clay mineral or an ion-exchanging layered compound, (d) an organic aluminium compound, and (e) an alkylating agent.

(7) A method for producing olefin polymers, which comprises homopolymerizing or copolymerizing olefins in the presence of the catalyst for olefin polymerization of any one of (1) to (6).

(8) The method for producing olefin polymers of (7), wherein the olefin is ethylene.

BEST MODE FOR CARRYING OUT THE INVENTION

First described in detail are the catalysts for olefin polymer production of the invention.

One aspect of the invention is to provide a catalyst for olefin polymer production, which comprises (a) a compound of a transition metal of Groups 8 to 10 of the Periodic Table, (b) clay, a clay mineral or an ion-exchanging layered compound, and (c) a silane compound. Preferably, this further contains (d) an organic aluminium compound and/or (e) an alkylating agent.

Another aspect thereof is to provide a catalyst for olefin polymer production, which comprises (a) a compound of a transition metal of Groups 8 to 10 of the Periodic Table, (b) clay, a clay mineral or an ion-exchanging layered compound, and (d) an organic aluminium compound. Preferably, this further contains (e) an alkylating agent.

The compound of a transition metal of Groups 8 to 10 of the Periodic Table to be the component (a) preferably has a diimine compound as the ligand, including, for example, complex compounds of a general formula (I):

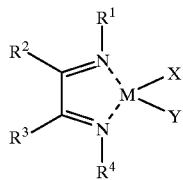

wherein $R^1$ and $R^4$ each independently represent an aliphatic hydrocarbon group having from 1 to 20 carbon atoms, or an aromatic croup having a hydrocarbon group on the ring and having from 7 to 20 carbon atoms in total; $R^2$ and $R^3$ each independently represent a hydrogen atom, or a hydrocarbon group having from 1 to 20 carbon atoms, and $R^2$ and $R^3$ may be bonded to each other to form a ring; X and Y each independently represent a halogen atom, a hydrogen atom, or a hydrocarbon group having from 1 to 20 carbon atoms; and M represents a transition metal of Groups 8 to 10 of the Periodic Table.

In the above general formula (I), the aliphatic hydrocarbon group having from 1 to 20 carbon atoms for $R^1$ and $R^4$ may be a linear or branched alkyl group having from 1 to 20 carbon atoms or a cycloalkyl group having from 3 to 20 carbon atoms, concretely including a methyl group, an ethyl group, an n-propyl group, an isopropyl group, an n-butyl group, an isobutyl group, a sec-butyl group, a tert-butyl group, a pentyl group, a hexyl group, an octyl group, a decyl group, a tetradecyl group, a hexadecyl group, an octadecyl group, a cyclopentyl group, a cyclohexyl group, and a cyclooctyl group, etc. Into the ring of the cycloalkyl group, a suitable substituent such as a lower alkyl group may be introduced. The aromatic group having a hydrocarbon group on the ring and having from 7 to 20 carbon atoms in total includes, for example, phenyl and naphthyl groups with at least one linear, branched or cyclic C1–10 alkyl group being on the aromatic ring. For $R^1$ and $R^4$, preferred is an aromatic group having a hydrocarbon group on the ring, and especially preferred is a 2,6-diisopropylphenyl group. $R^1$ and $R^4$ may be the same or different.

The hydrocarbon group having from 2 to 20 carbon atoms for $R^2$ and $R^3$ includes, for example, a linear or branched alkyl group having from 1 to 20 carbon atoms, a cycloalkyl group having from 3 to 20 carbon atoms, an aryl group having from 6 to 20 carbon atoms, and an aralkyl group having from 7 to 20 carbon atoms. For examples of the linear or branched alkyl group having from 1 to 20 carbon atoms and the cycloalkyl group having from 3 to 20 carbon atoms for $R^2$ and $R^3$, referred to are those of the C1–20 aliphatic hydrocarbon group mentioned hereinabove for $R^1$ and $R^4$. The aryl group having from 6 to 20 carbon atoms includes, for example, a phenyl group, a tolyl group, a xylyl group, a naphthyl group, a methylnaphthyl group, etc.; and the aralkyl group having from 7 to 20 carbon atoms includes, for example, a benzyl group, a phenethyl group, etc. $R^2$ and $R^3$ may be the same or different, may be bonded to each other to form a ring.

The halogen atom for X and Y includes, for example, chlorine, bromine and iodine atoms. For examples of the hydrocarbon group having from 1 to 20 carbon atoms for X and Y, referred to are those of the C1–20 hydrocarbon group mentioned hereinabove for $R^2$ and $R^3$. For X and Y, preferred are a halogen atom or a methyl group; and especially preferred is a methyl group. X and Y may be the same or different.

The transition metal of Groups 8 to 10 of the Periodic Table for M includes, for example, nickel, palladium, platinum, iron, cobalt, rhodium, ruthenium, etc. Preferred are nickel and palladium.

Specific examples of the complex compounds of formula (I) are compounds of the following formulae [3], [4], [5], [6], [7], [8], [9], [10], [11], [12], [13] and [14].

[3]
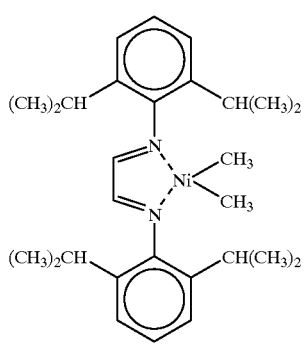

[4]
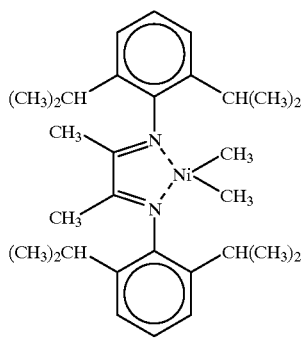

[5]
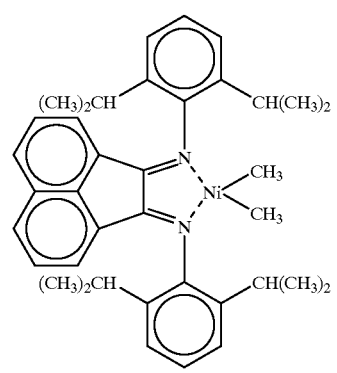

[6]
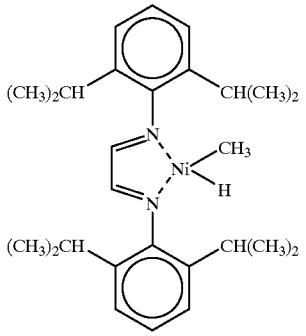

[7]
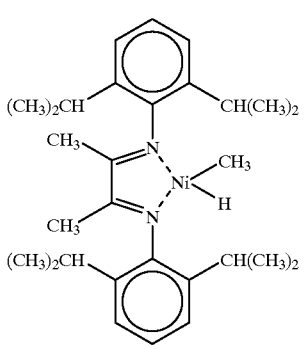

[8]
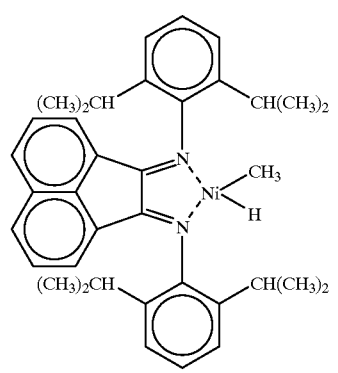

[9]
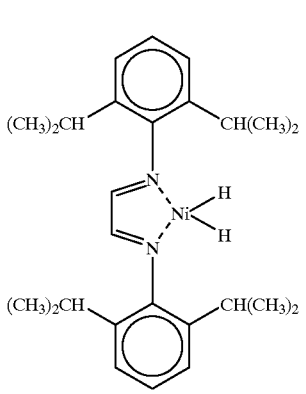

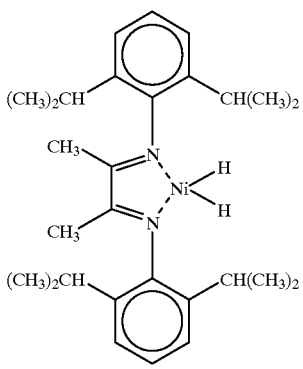

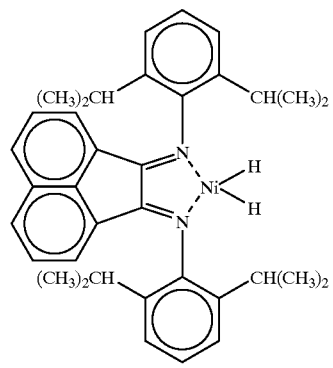

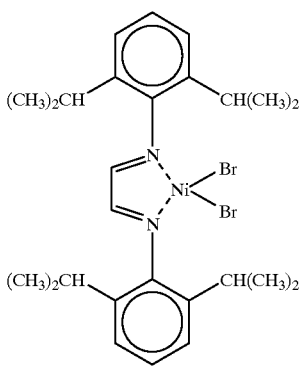

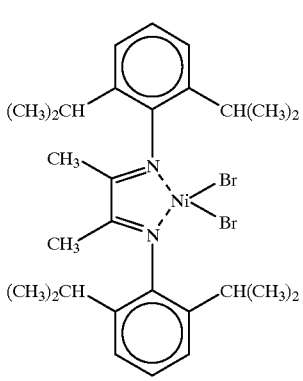

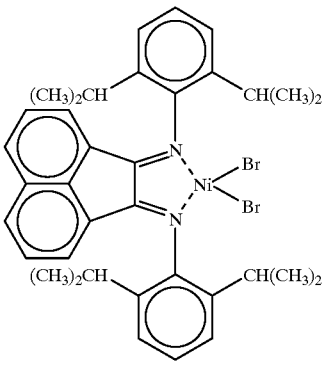

In the invention, one or more of the complex compounds noted above may be used as the component (a), either singly or as combined.

In the invention, any of clay, a clay mineral or an ion-exchanging layered compound is used as the component (b). Clay for use herein is an aggregate of fine hydrous silicate minerals. It is plastic when kneaded with a suitable amount of water, and is rigid when dried. When baked at high temperatures, it is sintered. The clay mineral includes hydrous silicates which are the essential components constituting clay.

These are not limited to only natural ones, but synthetic products of those substances are employable herein.

The ion-exchanging layered compound is a compound having a crystal structure of such that a plurality of crystal planes formed through ionic bonding are laminated in parallel layers via weak bonding force between the adjacent layers, in which the ions are exchangeable. Some clay minerals are ion-exchanging layered compounds.

For example, phyllosilicic acid compounds belong to clay minerals. The phyllosilicic acid compounds include phyllosilicic acid and phyllosilicates. As natural phyllosilicates, known are montmorillonite, saponite and hectorite of smectite family; illite and sericite of mica family; and mixed layer minerals of smectites and micas, or those of micas and vermiculites.

As synthetic products, known are fluoro-tetrasilicon mica, laponite, and smectone.

Also mentioned are ion-exchanging compounds having a layered crystal structure, such as $\alpha$—$Zr(HPO_4)_2$, $\gamma$—$Zr(HPO_4)_2$, $\alpha$—$Ti(HPO_4)_2$, and $\gamma$—$Ti(HPO_4)_2$. These are not clay minerals.

Examples of clay and clay minerals which do not belong to ion-exchanging layered compounds and which are usable as the component (b) include clay having a low montmorillonite content and referred to as bentonite; kibushi clay comprising montmorillonite and many other components; gairome clay; sepiolite and palygorskite having a fibrous morphology; and amorphous or low-crystalline allophane, and imogolite.

In the invention, the component (b) is contacted with a silane compound to be the component (c) and optionally with an alkylating agent to be the component (e). Therefore, it is desirable to chemically treat clay, clay minerals and ion-exchanging layered compounds for the component (b) for the purpose of removing impurities from them or for modifying their structures and functions.

The chemical treatment referred to herein indicates not only the surface treatment to remove impurities from the surfaces of the substances (b) but also any other treatment to modify the crystal structure of the substances (b). Concretely, it includes acid treatment, alkali treatment, salt treatment, and organic treatment.

The acid treatment is to remove impurities from their surfaces, while releasing cations of, for example, aluminium, iron and magnesium from their crystal structures to thereby enlarge their surface areas. The alkali treatment may destroy the crystal structure of the substances (b), thereby modifying their structure. The salt treatment and the organic treatment are to form ionic complexes, molecular complexes or organic complexes in the substances (b), whereby the surface areas of the substances (b) and even the layer-to-layer spaces therein may be changed. Owing to their ion-exchanging ability, the interlayer exchangeable ions in the substances (b) may be exchanged with any other bulky ions to give layered substances having enlarged interlayer spaces.

The substances (b) may be directly used herein as they are, or may be hydrated with additional water or may be dehydrated under heat before use.

Of the substances (b) noted above, preferred are clay and clay minerals in view of their activity, and most preferred are phyllosilicic acid compounds. Of phyllosilicic acid compounds, preferred are smectites, and more preferred is montmorillonite.

In the invention, a silane compound is used as the component (c). The silane compound includes, for example, trialkylsilyl chlorides such as trimethylsilyl chloride, triethylsilyl chloride, triisopropylsilyl chloride, tert-butyldimethylsilyl chloride, tert-butyldiphenylsilyl chloride, phenethyldimethylsilyl chloride; dialkylsilyl dichlorides such as dimethylsilyl dichloride, diethylsilyl dichloride, diisopropylsilyl dichloride, bisdiphenethylsilyl dichloride, methylphenethylsilyl dichloride, diphenylsilyl dichloride, dimethylsilyl dichloride, ditolylsilyl dichloride; alkylsilyl trichlorides such as methylsilyl trichloride, ethylsilyl trichloride, isopropylsilyl trichloride, phenylsilyl trichloride, mesitylsilyl trichloride, tolylsilyl trichloride, phenethylsilyl trichloride; other halides to be derived from the compounds noted above by substituting the chloride moiety with any other halogens; silylamines such as bis(trimethylsilyl)amine, bis(triethylsilyl)amine, bis(triisopropylsilyl)amine, bis(dimethylethylsilyl)amine, bis (diethylmethylsilyl) amine, bis(dimethylphenylsilyl)amine, bis (dimethyltolylsilyl)amine, bis(dimethylmesitylsilyl)amine, N,N-dimethylaminotrimethylsilane, (diethylamino) trimethylsilane, N-(trimethylsilyl)imidazole; polysilanols generally referred to as peralkylpolysiloxypolyols; silanols such as tris(trimethylsiloxy)silanol; silylamides such as N,O-bis(trimethylsilyl)acetamide, bis(trimethylsilyl) trifluoroacetamide, N-(trimethylsilyl)acetamide, bis (trimethylsilyl)urea, trimethylsilyldiphenylurea; linear siloxanes such as 1,3-dichlorotetramethyldisiloxane; cyclic siloxanes such as pentamethylcyclopentasiloxane; tetraalkylsilanes such as dimethyldiphenylsilane, diethyldiphenylsilane, diisopropyldiphenylsilane; trialkylsilanes such as trimethylsilane, triethylsilane, triisopropylsilane, tri-t-butylsilane, triphenylsilane, tritolylsilane, trimesitylsilane, methyldiphenylsilane, dinaphthylmethylsilane, bis(diphenyl)methylsilane; and also inorganic silicon compounds such as silicon tetrachloride, silicon tetrabromide. Of those, preferred are silylamines, and more preferred are trialkylsilane chlorides. One of those may be used as the component (c). As the case may be, two or more of those may be combined for the component (c).

In the invention, an organic aluminium compound may be used as the component (d). The organic aluminium compound is not specifically defined. For example, preferred are alkyl group-having aluminium compounds of the following general formula (II), linear aluminoxanes of the following general formula (III), and cyclic aluminoxanes and their associates of the following formula (IV).

$$R^5{}_m Al(OR^6)_n X_{3-m-n} \quad (II)$$

wherein $R^5$ and $R^6$ each represent an alkyl group having from 1 to 8, preferably from 1 to 4 carbon atoms; X represents a hydrogen atom or a halogen atom; $0<m\leq3$, preferably m=2 or 3, most preferably m=3; $0<n\leq3$, preferably n 0 or 1.

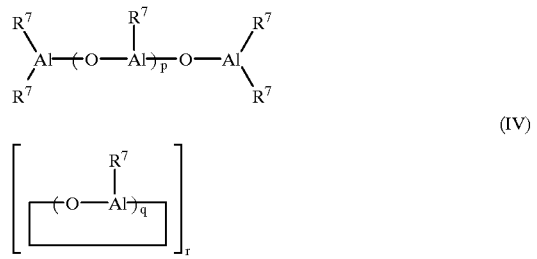

wherein $R^7$ represents an alkyl group having from 1 to 20, preferably from 1 to 8 carbon atoms, and plural $R^7$'s' may be the same or different; p, q and r are integers, falling $0<p\leq40$, $2<q\leq10$, and $1<r\leq50$.

Concretely, they include trialkylaluminiums such as trimethylaluminium, triethylaluminium, tripropylaluminium, triisobutylaluminium, tri-t-butylaluminium; halogen-, alkoxy group- or hydroxyl group-having alkylaluminiums such as dimethylaluminium chloride, diethylaluminium chloride, dimethylaluminium methoxide, diethylaluminium methoxide, dimethylaluminium hydroxide, diethylaluminium hydroxide; hydrogen atom-having alkylaluminiums such as dimethylaluminium hydride, diisobutylaluminium hydride; and aluminoxanes such as methylaluminoxane, ethylaluminoxane, isobutylaluminoxane. Of those, preferred are trimethylaluminium and triisobutylaluminium.

In the invention, one or more of those alkylaluminium compounds noted above may be used as the component (d), either singly or as combined.

In the invention, an alkylating agent is optionally used as the component (e). Various alkylating agents are known. For example, herein usable are alkyl group-having aluminium compounds of above formula (II) and also alkyl group-having magnesium compounds of a general formula (V):

$$R^7_2Mg \quad (V)$$

wherein $R^1$ has the same meaning as above, and alkyl group-having zinc compounds of a general formula (VI):

$$R^7_2Zn \quad (VI)$$

wherein $R^1$ has the same meaning as above.

Of those alkyl group-having compounds, preferred are alkyl group-having aluminium compounds; and more preferred are trialkylaluminiums and dialkylaluminiums. Concretely mentioned are trialkylaluminiums such as trimethylaluminium, triethylaluminium, tri-n-propylaluminium, triisobutylaluminium, tri-n-butylaluminium, triisobutylaluminium, tri-t-butylaluminium; dialkylaluminium halides such as dimethylaluminium chloride, diethylaluminium chloride, di-n-propylaluminium chloride, diisopropylaluminium chloride, di-n-butylaluminium chloride, diisobutylaluminium chloride, di-t-butylaluminium chloride; dialkylaluminium alkoxides such as dimethylaluminium methoxide, dimethylaluminium ethoxide; and dialkylaluminium hydrides such as dimethylaluminium hydride, diethylaluminium hydride, diisobutylaluminium hydride. Also mentioned are dialkylmagnesiums such as dimethylmagnesium, diethylmagnesium, di-n-propylmagnesium, diisopropylmagnesium, butylmagnesium; and dialkylzincs such as dimethylzinc, diethylzinc, ethyl-n-propylzinc, diisopropylzinc.

In the invention, one or more of those organic aluminium compounds noted above may be used as the component (e), either singly or as combined.

The proportions of the components constituting the catalysts of the invention are not specifically defined, but are preferably as follow, depending on the type of the constituent components.

Where the component (b) is clay or a clay mineral, it is desirable that the amount of the component (b) in the catalysts is generally from 0.1 to 100,000 mols, more preferably from 0.5 to 10,000 mols, in terms of the hydroxyl content of the component (b) and relative to one mol of the transition metal in the component (a), that the amount of the component (c) is generally from 0.1 to 100,000 mols, preferably from 0.5 to 10,000 mols, in terms of the silicon content of the component (c) and relative to the same, and that the amount of the component (d) is generally from 0.1 to 10,000,000 mols, preferably from 0.5 to 100,000 mols, in terms of the aluminium content of the component (d) and relative to the same. Where the component (b) is any other than clay and clay minerals, it is desirable that the amount the transition metal in the component (a) is from 0.00001 to 1 g relative to 1 g of the component (b), that the amount of the silicon atom in the component (c) is from 0.001 to 100 g relative to the same, and that the amount of the aluminium atom in the component (d) is from 0.001 to 100 g relative to the same. Where the catalysts contain the component (e) it is desirable that the amount of the aluminium, magnesium or zinc atom in the component (e) is from 1 to 10,000 mols relative to one mol of the transition metal in the component (a). Overstepping the ranges noted above, the polymerization activity of the catalysts will be low.

Preparation of the polymerization catalysts of the invention is not specifically defined, and various methods may be applied thereto. For example, for preparing the catalysts comprising the components (a), (b) and (c), employable is any of (1) a method of contacting the component (a) and the component (b) with each other, to which is added the component (c); (2) a method of contacting the component (a) and the component (c) with each other, to which is added the component (b); (3) a method of contacting the component (b) and the component (c) with each other, to which is added the component (a); or (4) a method of contacting the components (a), (b) and (c) all at a time with each other. Of those methods, preferred is the method (3). For preparing the catalysts comprising the components (a), (b) and (d), employable is any of (1) a method of contacting the component (a) and the component (b) with each other, to which is added the component (d); (2) a method of contacting the component (a) and the component (d) with each other, to which is added the component (b); (3) a method of contacting the component (b) and the component (d) with each other, to which is added the component (a); or (4) a method of contacting the components (a), (b) and (d) all at a time with each other. Of those methods, preferred is the method (3). For preparing the catalysts comprising the components (a), (b), (c) and (d), employable is any of (1) a method of contacting the component (a) and the component (b) with each other, to which are added the component (c) and the component (d); (2) a method of contacting the component (a), the component (c) and the component (d) with each other, to which is added the component (b); (3) a method of contacting the component (b), the component (c) and the component (d) with each other, to which is added the component (a); or (4) a method of contacting the components (a), (b), (c) and (d) all at a time with each other. Of those methods, preferred is the method (3).

For preparing the catalysts further containing the component (e), the order of adding the component (e) to the other constituent components is not specifically defined. Preferably, the constituent components other than the component (e) are previously contacted with each other in any of the methods noted above, and thereafter the component (e) is added to the polymerization system that contains the other constituent components having been previously contacted with each other. While or after the components are contacted with each other, a polymer such as polyethylene or polypropylene or an inorganic oxide such as silica or alumina may be in the catalyst system being prepared or may be contacted with the components being or having been contacted with each other.

Contacting the components with each other may be effected in an inert vapor such as nitrogen, or in a hydrocarbon such as pentane, hexane, heptane, toluene or xylene. Adding a constituent component to other components or contacting the constituent components with each other may be effected at a temperature for polymerization of monomers, or may be effected at a temperature falling between −30° C. and the boiling point of the solvent used, but is preferably effected at a temperature falling between room temperature and the boiling point of the solvent used.

The method of using the polymerization catalysts for polyolefin production of the invention is favorable to homopolymerization of olefins and also to copolymerization of olefins with other olefins and/or other monomers (that is, copolymerization of different types of olefins, or copolymerization of olefins with other monomers, or copolymerization of different types of olefins with other monomers).

Olefins to be polymerized in the invention are not specifically defined, but preferred are α-olefins having from 2 to 20 carbon atoms. The α-olefins include, for example, α-olefins such as ethylene, propylene, 1-butene, 3-methyl-1-butene, 4-methyl-1-butene, 4-phenyl-1-butene, 1-pentene, 3-methyl-1-pentene, 4-methyl-1-pentene, 3,3-dimethyl-1-pentene, 3,4-dimethyl-1-pentene, 4,4-dimethyl-1-pentene, 1-hexene, 4-methyl-1-hexene, 5-methyl-1-hexene, 6-phenyl-1-hexene, 1-octene, 1-decene, 1-dodecene, 1-tetradecene, 1-hexadecene, 1-octadecene, 1-eicosene, vinylcyclohexane; halogen-substituted α-olefins such as hexafluoropropene, tetrafluoroethylene, 2-fluoropropene, fluoroethylene, 1,1-difluoroethylene, 3-fluoropropene, trifluoroethylene, 3,4-dichloro-1-butene; and cyclic olefins such as cyclopentene, cyclohexene, norbornene, 5-methylnorbornene, 5-ethylnorbornene, 5-propylnorbornene, 5,6-dimethylnorbornene, 5-benzylnorbornene. Styrenic compounds are also usable as olefins herein. They include, for example, styrene; alkylstyrenes such as p-methylstyrene, p-ethylstyrene, p-propylstyrene, p-isopropylstyrene, p-butylstyrene, p-tert-butylstyrene, p-phenylstyrene, o-methylstyrene, o-ethylstyrene, o-propylstyrene, o-isopropylstyrene, m-methylstyrene, m-ethylstyrene, m-isopropylstyrene, m-butylstyrene, mesitylstyrene, 2,4-dimethylstyrene, 2,5-dimethylstyrene, 3,5-dimethylstyrene; alkoxystyrenes such as p-methoxystyrene, o-methoxystyrene, m-methoxystyrene; halogenostyrenes such as p-chlorostyrene, m-chlorostyrene, o-chlorostyrene, p-bromostyrene, m-bromostyrene, o-bromostyrene, p-fluorostyrene, m-fluorostyrene, o-fluorostyrene, o-methyl-p-fluorostyrene; and also trimethylsilylstyrene, vinylbenzoates, divinylbenzene. The other olefins to be copolymerized may be suitably selected from the olefins noted above.

In the invention, one or more olefins may be homopolymerized or copolymerized either singly or as combined. Where two or more different olefins are copolymerized, the olefins noted above may be combined in any desired manner.

In the invention, olefins such as those mentioned above may be copolymerized with any other comonomers. The comonomers include, for example, linear diolefins such as butadiene, isoprene, 1,4-pentadiene, 1,5-hexadiene; polycyclic olefins such as norbornene, 1,4,5,8-dimethano-1,2,3,4, 4a,5,8,8a-octahydronaphthalene, 2-norbornene; cyclic diolefins such as norbornadiene, 5-ethylidenenorbornene, 5-vinylnorbornene, dicyclopentadiene; and unsaturated esters such as ethyl acrylate, methyl methacrylate.

In the invention, ethylene is especially preferred as olefins.

The mode of olefin polymerization is not specifically defined, and herein employable is any desired polymerization mode of slurry polymerization, solution polymerization, vapor phase polymerization, bulk polymerization or suspension polymerization.

Solvents may be used in polymerization. They include, for example, hydrocarbons and halogenohydrocarbons such as benzene, toluene, xylene, n-hexane, n-heptane, cyclohexane, chloromethylene, chloroform, 1,2-dichloroethane, and chlorobenzene. One or more such solvents may be used either singly or as combined. Depending on their type, monomers to be polymerized may also serve as solvents.

In view of the catalytic activity for polymerization and of the reactor efficiency, it is desirable that the amount of the catalyst to be in the polymerization system is so controlled that the amount of the component (a) could fall generally between 2 and 100 μmols, but preferably between 7 and 25 μmols, in one liter of the solvent in the system.

Regarding the polymerization condition, the pressure may fall generally between ordinary pressure and 2000 kg/cm$^2$G. The reaction temperature may fall generally between −50 and 250° C. For controlling the molecular weight of the polymers to be produced, the type and the amount of the catalytic components to be used and the polymerization temperature will be suitably selected. If desired, hydrogen may be introduced into the polymerization system for that purpose.

The invention is described in more detail with reference to the following Examples, which, however, are not intended to restrict the scope of the invention.

First described are Examples of preparing catalysts for olefin polymerization that comprise (a) a compound of a transition metal of Groups 8 to 10 of the Periodic Table, (b) any of clay, a clay mineral or an ion-exchanging layered compound, and (c) a silane compound, especially those further containing (d) an organic aluminium compound and/or (e) an alkylating agent.

EXAMPLE 1

Production of Polyethylene
(1) Chemical Treatment of Clay Mineral:

40 g of a commercial product of montmorillonite (Kunipia F from Kunimine Industry) was ground in a grinder for 4 hours. 20 g of the powdered montmorillonite was put into a four-neck flask having a capacity of 500 ml, and dispersed in 100 ml of deionized water containing 20 g of magnesium chloride 6-hydrate dissolved therein. This was stirred at 90° C. for 0.5 hour. After having been thus processed, the solid residue was washed with water. This treatment was repeated once again. Thus was obtained magnesium chloride-processed montmorillonite. After dried, this was dispersed in 160 ml of an aqueous solution of 6% HCl, and stirred under reflux for 2 hours. After having been thus processed, this was washed with water through repeated filtration until the filtration wash became neutral, and then dried. Thus was obtained chemical-treated montmorillonite.

(2) Chemical Treatment with Silane Compound:

1.0 g of the chemical-treated montmorillonite that had been prepared in (1) (this had a water content of 15% by weight; the water content was obtained from the weight loss after dehydration under heat at 150° C. for 1 hour—the same shall apply hereunder) was put into a Schlenk's tube having a capacity of 300 ml, and dispersed in 25 ml of toluene to obtain a slurry, to which was added 1.13 g (5.2 mmols) of methylphenethylsilyl dichloride. The resulting slurry was stirred at room temperature for 60 hours and then under heat at 100° C. for 1 hour. After this was cooled to room temperature, the supernatant was removed from it, and the remaining solid was washed with 200 ml of toluene. Next, toluene was again added to the thus-washed slurry to be 50 ml in total.

(3) Polymerization of Ethylene:

A 1.6-liter autoclave was fully dried and then purged with nitrogen. 400 ml of toluene having been dewatered at room temperature, 5 ml of the clay mineral dispersion having been prepared in the previous step (2) (this corresponds to 0.1 g of the clay mineral), and 6.8 μmols of nickel complex [3] were put into the autoclave in that order, and ethylene was continuously introduced into the autoclave at 25° C. and under a controlled pressure of 8 kg/cm$^2$G, and polymerized therein for 1 hour in that condition. After this, methanol was added to the system to terminate the polymerization. The polymer thus produced was taken out through filtration, and dried under reduced pressure at 90° C. for 12 hours. As a result, obtained was 23.1 g of the polymer. The polymerization activity of the catalyst used was 57.8 kg/g—Ni·hr.

The polymer had a limiting viscosity [η] as measured in decalin at 135° C. of 3.12 dl/g, a melting point as measured through differential scanning calorimetry (DSC) of 132.4° C., and a density of 0.9309/cm$^3$.

EXAMPLE 2

Production of Polyethylene

The same process as in Example 1 was repeated, except that nickel complex [4] was used in place of nickel complex [3], to obtain 29.8 g of a polymer. The polymerization activity of the catalyst used was 74.6 kg/g—Ni·hr.

The polymer had a limiting viscosity [η] as measured in decalin at 135° C. of 22.5 dl/g, a melting point as measured through differential scanning calorimetry (DSC) of 113.7° C., and a density of 0.9047/cm$^3$.

EXAMPLE 3

Production of Polyethylene

The same process as in Example 1 was repeated, except that nickel complex [5] was used in place of nickel complex [3], to obtain 16.4 g of a polymer. The polymerization activity of the catalyst used was 41.0 kg/g—Ni·hr.

The polymer had a limiting viscosity [η] as measured in decalin at 135° C. of 9.54 dl/g, a melting point as measured through differential scanning calorimetry (DSC) of 123.6° C., and a density of 0.9178/cm$^3$.

COMPARATIVE EXAMPLE 1

In the same manner as in Example 1 except that the step (2) of silane treatment was omitted, 9.3 g of a polymer was obtained (catalyst activity: 23.3 kg/g—Ni·hr)

The polymer had a limiting viscosity [η] as measured in decalin at 135° C. of 3.12 dl/g, a melting point as measured through differential scanning calorimetry (DSC) of 132° C., and a density of 0.9373/cm$^3$.

EXAMPLE 4

Production of Polyethylene (1) Chemical Treatment of Clay Mineral:

40 g of a commercial product of montmorillonite (Kunipia F from Kunimine Industry) was ground in a grinder for 4 hours. 20 g of the powdered montmorillonite was put into a four-neck flask having a capacity of 500 ml, and dispersed in 100 ml of deionized water containing 20 g of magnesium chloride 6-hydrate dissolved therein. This was stirred at 90° C. for 0.5 hour. After having been thus processed, the solid residue was washed with water. This treatment was repeated once again. Thus was obtained magnesium chloride-processed montmorillonite. After dried, this was dispersed in 160 ml of an aqueous solution of 6% HCl, and stirred under reflux for 2 hours. After having been thus processed, this was washed with water through repeated filtration until the filtration wash became neutral, and then dried. Thus was obtained chemical-treated montmorillonite.

(2) Chemical Treatment with Silane Compound and Organic Aluminium Compound:

1.0 g of the chemical-treated montmorillonite that had been prepared in (1) (this had a water content of 15% by weight; the water content was obtained from the weight loss after dehydration under heat at 150° C. for 1 hour—the same shall apply hereunder) was put into a Schlenk s tube having a capacity of 300 ml, and dispersed in 25 ml of toluene to obtain a slurry, to which was added 1.13 g (5.2 mmols) of methylphenethylsilyl dichloride. The resulting slurry was stirred at room temperature for 60 hours and then under heat at 100° C. for 1 hour. After this was cooled to room temperature, the supernatant was removed from it, and the remaining solid was washed with 200 ml of toluene. Next, 100 μmols of triisobutylaluminium was added thereto, then stirred at room temperature for 30 minutes, and thereafter kept static for a while. The resulting solid residue was washed with 200 ml of toluene. Toluene was further added to the thus-washed slurry to be 50 ml in total.

(3) Polymerization of Ethylene:

A 1.6-liter autoclave was fully dried and then purged with nitrogen. 400 ml of toluene having been dewatered at room temperature, 5 ml of the clay mineral dispersion having been prepared in the previous step (2) (this corresponds to 0.1 g of the clay mineral), and 6.8 μmols of nickel complex 13) were put into the autoclave in that order, and ethylene was continuously introduced into the autoclave at 25° C. and under a controlled pressure of 8 kg/cm$^2$G, and polymerized therein for 1 hour in that condition. After this, methanol was added to the system to terminate the polymerization. The polymer thus produced was taken out through filtration, and dried under reduced pressure at 90° C. for 12 hours. As a result, obtained was 35 g of the polymer. The polymerization activity of the catalyst used was 88 kg/g—Ni·hr.

The polymer had a limiting viscosity [η] as measured in decalin at 135° C. of 3.06 dl/g, and a melting point as measured through differential scanning calorimetry (DSC) of 128.9° C.

EXAMPLE 5

Production of Polyethylene (1) Chemical Treatment of Clay Mineral:

This is the same as in (1) in Example 4.

(2) Chemical Treatment with Silane Compound and Organic Aluminium Compound:

This is the same as in (2) in Example 4.

(3) Polymerization of Ethylene:

A 1.6-liter autoclave was fully dried and then purged with nitrogen. 400 ml of toluene having been dewatered at room temperature, 5 ml of the clay mineral dispersion having been prepared in the previous step (2) (this corresponds to 0.1 g of the clay mineral) 6.8 µmols of nickel complex [3] and 0.68 µmols of trimethylaluminium were put into the autoclave in that order, and ethylene was continuously introduced into the autoclave at 25° C. and under a controlled pressure of 8 kg/cm$^2$G, and polymerized therein for 1 hour in that condition. After this, methanol was added to the system to terminate the polymerization. The polymer thus produced was taken out through filtration, and dried under reduced pressure at 90° C. for 12 hours. As a result, obtained was 17.1 g of the polymer. The polymerization activity of the catalyst used was 43 kg/g—Ni·hr.

The polymer had a limiting viscosity [η] of 4.30 dl/g, and a melting point as measured through DSC of 130.0° C.

EXAMPLE 6

Production of Polyethylene (1) Chemical Treatment of Clay Mineral:

This is the same as in (1) in Example 4.

(2) Chemical Treatment with Silane Compound and Organic Aluminium Compound:

This is the same as in (2) in Example 4.

(3) Polymerization of Ethylene:

In the same manner as in (3) in Example 1 except that nickel complex [4] was used in place of nickel complex [3], obtained was 36.0 g of a polymer. The polymerization activity of the catalyst used was 90.3 kg/g—Ni·hr.

The polymer had a limiting viscosity [η] of 24.2 dl/g, and a melting point as measured through DSC of 110.6° C.

EXAMPLE 7

Production of Polyethylene (1) Chemical Treatment of Clay Mineral:

This is the same as in (1) in Example 4.

(2) Chemical Treatment with Silane Compound and Organic Aluminium Compound:

This is the same as in (2) in Example 4.

(3) Polymerization of Ethylene:

In the same manner as in (3) in Example 1 except that nickel complex [5] was used in place of nickel complex [3], obtained was 37.6 g of a polymer. The polymerization activity of the catalyst used was 94.2 kg/g—Ni·hr.

The polymer had a limiting viscosity [η] of 8.55 dl/g, and a melting point as measured through DSC of 120.2° C.

EXAMPLE 8

Production of Polyethylene (1) Chemical Treatment of Clay Mineral:

This is the same as in (1) in Example 4.

(2) Chemical Treatment with Silane Compound:

The same process as in (2) in Example 1 was repeated except that the treatment with triisobutylaluminium was omitted.

(3) Polymerization of Ethylene:

A 1.6-liter autoclave was fully dried and then purged with nitrogen. 400 ml of toluene having been dewatered at room temperature, 5 ml of the clay mineral dispersion having been prepared in the previous step (2) (this corresponds to 0.1 g of the clay mineral), 6. 8 µmols of nickel complex [3] and 0.68 µmol of trimethylaluminium were put into the autoclave in that order, and ethylene was continuously introduced into the autoclave at 25° C. and under a controlled pressure of 8 kg/cm$^2$G, and polymerized therein for 1 hour in that condition. After this, methanol was added to the system to terminate the polymerization. The polymer thus produced was taken out through filtration, and dried under reduced pressure at 90° C. for 12 hours. As a result, obtained was 9.9 g of the polymer. The polymerization activity of the catalyst used was 24.8 kg/g—Ni·hr.

The polymer had a limiting viscosity [η] of 3.24 dl/g, and a melting point as measured through DSC of 132.7° C.

EXAMPLE 9

Production of Polyethylene

The same process as in Example 8 was repeated, except that triisobutylaluminium was used in place of trimethylaluminium, to obtain 3.9 g of a polymer. The polymerization activity of the catalyst used was 9.8 kg/g—Ni·hr.

The polymer had a limiting viscosity [η] of 3.81 dl/g, and a melting point as measured through DSC of 131.2° C.

EXAMPLE 10

Production of Polyethylene

The same process as in Example 8 was repeated, except that the reaction temperature for ethylene polymerization was 50° C., to obtain 6.8 g of a polymer. The polymerization activity of the catalyst used was 17.0 kg/g—Ni·hr.

The polymer had a limiting viscosity [η] of 2.46 dl/g, and a melting point as measured through DSC of 125.1° C.

EXAMPLE 11

Production of Polyethylene (1) Chemical Treatment of Clay Mineral:

This is the same as in (1) in Example 4.

(2) Chemical Treatment with Silane Compound:

This is the same as in (2) in Example 8.

(3) Polymerization of Ethylene:

A 1.6-liter autoclave was fully dried and then purged with nitrogen. 400 ml of toluene having been dewatered at room temperature, 5 ml of the clay mineral dispersion having been prepared in the previous step (2) (this corresponds to 0.1 g of the clay mineral), and 0.68 µmols of trimethylaluminium were put into the autoclave in that order, and heated at 80°

C. for 1 hour. Next, after this was cooled to room temperature, 6.8 μmols of nickel complex [12] was put into the autoclave, and ethylene was continuously introduced thereinto at 25° C. and under a controlled pressure of 8 kg/cm²G, and polymerized therein for 1 hour in that condition. After this, methanol was added to the system to terminate the polymerization. The polymer thus produced was taken out through filtration, and dried under reduced pressure at 90° C. for 12 hours. As a result, obtained was 15.2 g of the polymer. The polymerization activity of the catalyst used was 38.1 kg/g—Ni·hr.

The polymer had a limiting viscosity [η] of 2.77 dl/g, and a melting point as measured through DSC of 130.1° C.

EXAMPLE 32

Production of Polyethylene

In the same manner as in Example 8 except that nickel complex [13] was used in place of nickel complex [12], obtained was 16.3 g of a polymer. The polymerization activity of the catalyst used was 40.8 kg/g—Ni·hr.

The polymer had a limiting viscosity [η] of 6.7 dl/g, and a melting point as measured through DSC of 119.4° C.

EXAMPLE 13

Production of Polyethylene

In the same manner as in Example 8 except that nickel complex [14] was used in place of nickel complex [12], obtained was 16.4 g of a polymer. The polymerization activity of the catalyst used was 41.1 kg/g—Ni hr.

The polymer had a limiting viscosity [η] of 11.4 dl/g, and a melting point as measured through DSC of 114.9° C.

COMPARATIVE EXAMPLE 2

The same process as in Example 4 was repeated except that nickel complex [12] was used in place of nickel complex [3], that 0.68 mmol of methylaluminoxane was used in place of the clay mineral, and that the polymerization time was 30 minutes. Herein obtained was 40.6 g of a polymer (catalyst activity: 203.0 kg/g—Ni·hr)

The polymer had a limiting viscosity [η] of 1.77 dl/g, and a melting point as measured through DSC of 120.2° C.

Next described are Examples of preparing catalysts for olefin polymerization that comprise (a) a compound of a transition metal of Groups 8 to 10 of the Periodic Table, (b) any of clay, a clay mineral or an ion-exchanging layered compound, and (d) an organic aluminium compound, especially those further containing (e) an alkylating agent.

EXAMPLE 14

Production of Polyethylene
(1) Chemical Treatment of Clay Mineral:
40 g of a commercial product of montmorillonite (Kunipia F from Kunimine Industry) was ground in a grinder for 4 hours. 20 g of the powdered montmorillonite Was put into a four-neck flask having a capacity of 500 ml, and dispersed in 100 ml of deionized water containing 20 g of magnesium chloride 6-hydrate dissolved therein. This was stirred at 90° C. for 0.5 hours. After having been thus processed, the solid residue was washed with water. This treatment was repeated once again. Thus was obtained magnesium chloride-processed montmorillonite. After dried, this was dispersed in 160 ml of an aqueous solution of 6% HCl, and stirred under reflux for 2 hours. After having been thus processed, this was washed with water through repeated filtration until the filtration wash became neutral, and then dried. Thus was obtained chemical-treated montmorillonite.

(2) Chemical Treatment with Organic Aluminium Compound:

1.0 g of the chemical-treated montmorillonite that had been prepared in (1) (this had a water content of 15% by weight; the water content was obtained from the weight loss after dehydration under heat at 150° C. for 1 hour—the same shall apply hereunder) was put into a Schlenk s tube having a capacity of 300 ml, and dispersed in 25 ml of toluene to obtain a slurry, to which was added 200 μmols of trimethylaluminium. The resulting slurry was stirred at room temperature for 60 hours and then under heat at 100° C. for 1 hour. After this was cooled to room temperature, the supernatant was removed from it, and the remaining solid was washed with 200 ml of toluene. Next, toluene was again added to the thus-washed slurry to be 50 ml in total.

(3) Polymerization of Ethylene:

A 1.6-liter autoclave was fully dried and then purged with nitrogen. 400 ml of toluene having been dewatered at room temperature, 5 ml of the clay mineral dispersion having been prepared in the previous step (2) (this corresponds to 0.1 g of the clay mineral), 6.8 μmols of nickel complex [12], and 0.68 mmols of trimethylaluminium were put into the autoclave in that order, and ethylene was continuously introduced into the autoclave at 25° C. and under a controlled pressure of 8 kg/cm²G, and polymerized therein for 1 hour in that condition. After this, methanol was added to the system to terminate the polymerization. The polymer thus produced was taken out through filtration, and dried under reduced pressure at 90° C. for 12 hours. As a result, obtained was 5.2 g of the polymer. The polymerization activity of the catalyst used was 13 kg/g—Ni·hr.

The polymer had a limiting viscosity [η] of 2.42 dl/g, and a melting point as measured through DSC of 132.7° C. With no sticky component, this was granular.

EXAMPLE 15

Production of Polyethylene
(1) Chemical Treatment of Clay Mineral:
This is the same as in (1) in Example 14.
(2) Chemical Treatment with Organic Aluminium Compound:
This is the same as in (2) in Example 14.
(3) Polymerization of Ethylene:
In the same manner as in Example 14 except that no trimethylaluminium was added to the system and that nickel complex [3] was used in place of nickel complex [12], obtained was 1.61 g of a polymer. The polymerization activity of the catalyst used was 4 kg/g—Ni·hr.

The polymer had a limiting viscosity [η] of 3.43 dl/g, and a melting point as measured through DSC of 130.9° C. With no sticky component, this was granular.

EXAMPLE 16

Production of Polyethylene
(1) Chemical Treatment of Clay Mineral:
  This is the same as in (1) in Example 14.
(2) Chemical Treatment with Organic Aluminium Compound:
  This is the same as in (2) in Example 14.
(3) Polymerization of Ethylene:
  In the same manner as in Example 14 except that no trimethylaluminium was added to the system and that the reaction time was 2 hours, obtained was 4.5 g of a polymer. The polymerization activity of the catalyst used was 5.6 kg/g—Ni hr.
  The polymer had a limiting viscosity [1] of 3.49 dl/g, and a melting point as measured through DSC of 132.3° C. With no sticky component, this was granular.

EXAMPLE 17

Production of Polyethylene
(1) Chemical Treatment of Clay Mineral:
  This is the same as in (1) in Example 14.
(2) Chemical Treatment with Organic Aluminium Compound:
  The same process as in (2) in Example 14 was repeated except that triisobutylaluminium was used in place of trimethylaluminium.
(3) Polymerization of Ethylene:
  In the same manner as in Example 14 except that triisobutylaluminium was used in place of trimethylaluminium and that the clay mineral prepared in the previous step (2) was used in place of that prepared in (2) in Example 14, obtained was 0.38 g of a polymer. The polymerization activity of the catalyst used was 0.95 kg/g—Ni·hr.
  The polymer had a limiting viscosity [η] of 4.19 dl/g, and a melting point as measured through DSC of 132.3° C. With no sticky component, this was granular.

EXAMPLE 18

Production of Polyethylene
(1) Chemical Treatment of Clay Mineral:
  This is the same as in (1) in Example 14.
(2) Chemical Treatment with Organic Aluminium Compound:
  This is the same as in (2) in Example 17.
(3) Polymerization of Ethylene:
  In the same manner as in Example 17 except that nickel complex [3] was used in place of nickel complex [12] and that triisobutylaluminium was not used, obtained was 1.33 g of a polymer. The polymerization activity of the catalyst used was 3.3 kg/g—Ni·hr.
  The polymer had a limiting viscosity [η] of 3.17 dl/g, and a melting point as measured through DSC of 136.2° C., With no sticky component, this was granular.

COMPARATIVE EXAMPLE 3

The same process as in Example 14 was repeated except that nickel complex [12] was used in place of nickel complex [3], that 0.68 mmol of methylaluminoxane was used in place of the clay mineral, and that the polymerization time was 30 minutes. Herein obtained was 40.6 g of a polymer (catalyst activity: 203.0 kg/g—Ni·hr).

The polymer had a limiting viscosity [η] of 1.77 dl/g, and a melting point as measured through DSC of 120.2° C. Containing a sticky component, this was amorphous.

Nickel complexes [3], [4], [5], [12], [13] and [14] used in the above Examples and Comparative Examples are mentioned below.

[3]
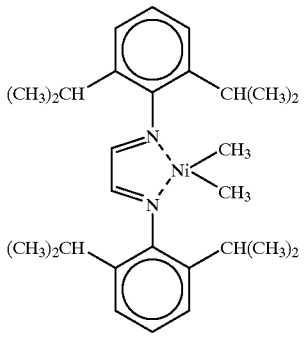

[4]
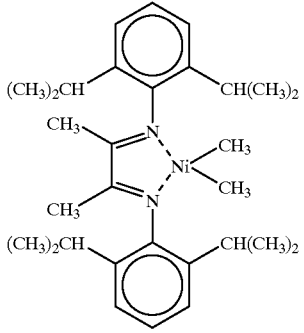

[5]
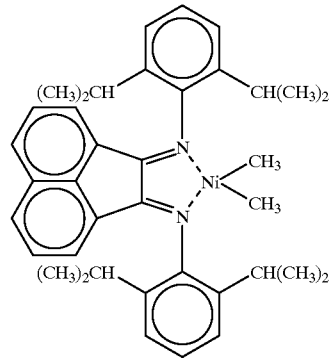

[12]
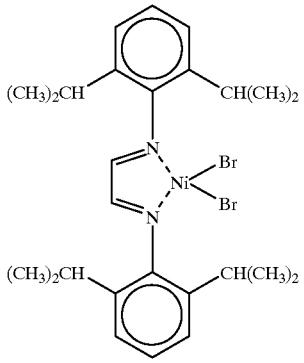

-continued

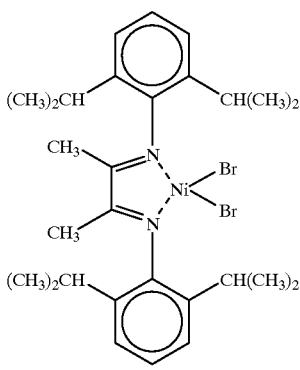

[13]

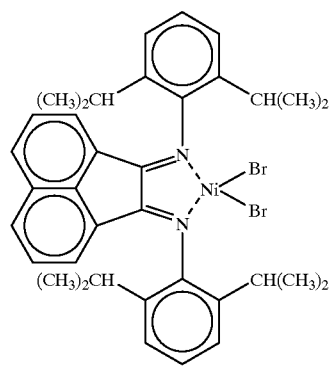

[14]

INDUSTRIAL APPLICABILITY

According to the invention, a large amount of methylaluminoxane, which is expensive and is not easy to handle and which is unstable during storage and is highly dangerous, is not used, and the amount of the organic aluminium compound to be used in the entire polymerization system could be reduced. Therefore, a large amount of a metal residue does not remain in the polymers produced, and the polymers produced do not require any post-treatment. The catalysts of the invention have high activity, with which olefin polymers can be produced efficiently and inexpensively.

In addition, polymer morphology control is easy in the invention, in which are produced high-melting point olefin polymers inexpensively and advantageously on an industrial scale.

What is claimed is:

1. A catalyst for olefin polymer production, comprising:

(a) a compound of a transition metal of Group 8, 9 or 10 of the Periodic Table, (b) a smectite selected from the group consisting of montmorillonite, saponite and hectorite; a mica selected from the group consisting of illite and sericite; a mixed layer mineral of a smectite and a mica; a mixed layer mineral of a mica and a vermiculite; a fluoro-tetrasilicon mica; laponite, smectone or an ion-exchanging layered compound, and (c) a silane compound.

2. A catalyst for olefin polymer production, comprising:

(a) a compound of a transition metal of Group 8, 9 or 10 of the Periodic Table, (b) a smectite selected from the group consisting of montmorillonite, saponite and hectorite; a mica selected from the group consisting of illite and sericite; a mixed layer mineral of a smectite and a mica; a mixed layer mineral of a mica and a vermiculite; a fluoro-tetrasilicon mica; laponite, smectone or an ion-exchanging layered compound; (c) a silane compound, and (d) an organic aluminum compound.

3. A catalyst for olefin polymer production, comprising:

(a) a compound of a transition metal of Group 8, 9 or 10 of the Periodic Table, (b) a smectite selected from the group consisting of montmorillonite, saponite and hectorite; a mica selected from the group consisting of illite and sericite; a mixed layer mineral of a smectite and a mica; a mixed layer mineral of a mica and a vermiculite; a fluoro-tetrasilicon mica; laponite, smectone or an ion-exchanging layered compound, (c) a silane compound, and (e) an alkylating agent.

4. A catalyst for olefin polymer production, comprising:

(a) a compound of a transition metal of Group 8, 9 or 10 of the Periodic Table, (b) a smectite selected from the group consisting of montmorillonite, saponite and hectorite; a mica selected from the group consisting of illite and sericite; a mixed layer mineral of a smectite and a mica; a mixed layer mineral of a mica and a vermiculite; a fluoro-tetrasilicon mica; laponite, smectone or an ion-exchanging layered compound, (c) a silane compound, (d) an organic aluminum compound and (e) an alkylating agent.

5. A catalyst for olefin polymer production, comprising:

(a) a compound of a transition metal of Group 8, 9 or 10 of the Periodic Table, (b) a smectite selected from the group consisting of montmorillonite, saponite and hectorite; a mica selected from the group consisting of illite and sericite; a mixed layer mineral of a smectite and a mica; a mixed layer mineral of a mica and a vermiculite; a fluoro-tetrasilicon mica; laponite, smectone or an ion-exchanging layered compound, (d) an organic aluminum compound.

6. A catalyst for olefin polymer production, comprising:

(a) a compound of a transition metal of Group 8, 9 or 10 of the Periodic Table, (b) a smectite selected from the group consisting of montmorillonite, saponite and hectorite; a mica selected from the group consisting of illite and sericite; a mixed layer mineral of a smectite and a mica; a mixed layer mineral of a mica and a vermiculite; a fluoro-tetrasilicon mica; laponite, smectone or an ion-exchanging layered compound, (d) an organic aluminum compound, and (e) an alkylating agent.-

7. A method for producing olefin polymers, which comprises homopolymerizing or copolymerizing olefins in the presence of the catalyst for olefin polymerization of claim 1.

8. The method for producing olefin polymers as claimed in claim 7, wherein the olefin is ethylene.

9. A method for producing olefin polymers, which comprises homopolymerizing or copolymerizing olefins in the presence of the catalyst for olefin polymerization of claim 2.

10. A method for producing olefin polymers, which comprises homopolymerizing or copolymerizing olefins in the presence of the catalyst for olefin polymerization of claim 3.

11. A method for producing olefin polymers, which comprises homopolymerizing or copolymerizing olefins in the presence of the catalyst for olefin polymerization of claim 4.

12. A method for producing olefin polymers, which comprises homopolymerizing or copolymerizing olefins in the presence of the catalyst for olefin polymerization of claim 5.

13. A method for producing olefin polymers, which comprises homopolymerizing or copolymerizing olefins in the presence of the catalyst for olefin polymerization of claim 6.

* * * * *

UNITED STATES PATENT AND TRADEMARK OFFICE
CERTIFICATE OF CORRECTION

PATENT NO. : 6,335,405 B1  Page 1 of 1
DATED : January 1, 2002
INVENTOR(S) : Okuda et al.

It is certified that error appears in the above-identified patent and that said Letters Patent is hereby corrected as shown below:

<u>Title page,</u>
Item [30], Foreign Application Priority information should read:

-- (30)  Foreign Application Priority Data

Mar. 20, 1998  (JP) ................................. 10-72698
Mar. 20, 1998  (JP) ................................. 10-72699
Mar. 20, 1998  (JP) ................................. 10-72700 --

Signed and Sealed this

Fourth Day of June, 2002

*Attest:*

*Attesting Officer*

JAMES E. ROGAN
*Director of the United States Patent and Trademark Office*